US009965554B2

(12) United States Patent
Armstrong

(10) Patent No.: US 9,965,554 B2
(45) Date of Patent: *May 8, 2018

(54) SYSTEM AND METHOD FOR INDEXING AND DISPLAYING DOCUMENT TEXT THAT HAS BEEN SUBSEQUENTLY QUOTED

(71) Applicant: Geronimo Development Corporation, St. Cloud, MN (US)

(72) Inventor: Orin Russell Armstrong, Becker, MN (US)

(73) Assignee: GERONIMO DEVELOPMENT CORPORATION, St. Cloud, MN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/161,936

(22) Filed: May 23, 2016

(65) Prior Publication Data
US 2016/0267185 A1 Sep. 15, 2016

Related U.S. Application Data

(63) Continuation of application No. 14/317,684, filed on Jun. 27, 2014, now Pat. No. 9,348,919, which is a
(Continued)

(51) Int. Cl.
*G06F 17/30* (2006.01)

(52) U.S. Cl.
CPC .. *G06F 17/30864* (2013.01); *G06F 17/30696* (2013.01); *G06F 17/30728* (2013.01); *G06F 17/30882* (2013.01); *G06F 17/30887* (2013.01)

(58) Field of Classification Search
CPC ......... G06F 17/30696; G06F 17/30728; G06F 17/30864; G06F 17/30882; G06F 17/30887
See application file for complete search history.

(56) References Cited

U.S. PATENT DOCUMENTS 5,495,581 A 2/1996 Tsai
5,594,897 A 1/1997 Goffman
(Continued)

FOREIGN PATENT DOCUMENTS

JP 61300566 6/1988
WO 1997012334 A1 4/1997

OTHER PUBLICATIONS

Jan. 23, 2009 Office Action (U.S. Appl. No. 11/153,594).
(Continued)

*Primary Examiner* — Dinku Gebresenbet
(74) *Attorney, Agent, or Firm* — Tysver Beck Evans, PLLC

(57) ABSTRACT

A computerized system and method is presented for analyzing quotations made in a quoting document of text originally found in a source document. The quoting document and source document can be web pages publicly available on the World Wide Web. The present invention analyzes the quoting document for quoted text, searches the source document for that text, and stores the existence of the quotation in association with the source document. When displaying the source document, quoted text is highlighted. A link is provided between items of quoted text and a list of documents that have quoted that text. From this list the full text of a quoting document may be displayed.

8 Claims, 7 Drawing Sheets

Related U.S. Application Data continuation of application No. 12/383,674, filed on Mar. 26, 2009, now Pat. No. 8,768,911, which is a continuation-in-part of application No. 11/153,594, filed on Jun. 15, 2005, now Pat. No. 8,805,781.

(60) Provisional application No. 61/070,901, filed on Mar. 26, 2008.

(56) References Cited

U.S. PATENT DOCUMENTS

| | | |
|---|---|---|
| 5,794,236 A | 8/1998 | Mehrle |
| 5,832,476 A | 11/1998 | Tada et al. |
| 5,870,770 A | 2/1999 | Wolfe |
| 5,940,800 A | 8/1999 | Bennett et al. |
| 5,950,214 A | 9/1999 | Rivette et al. |
| 5,987,454 A | 11/1999 | Hobbs |
| 6,038,574 A | 3/2000 | Pitkow et al. |
| 6,256,631 B1 | 7/2001 | Malcolm |
| 6,263,351 B1 * | 7/2001 | Wolfe .............. G06F 17/30728 707/E17.008 |
| 6,289,342 B1 | 9/2001 | Lawrence et al. |
| 6,317,741 B1 * | 11/2001 | Burrows ........... G06F 17/30622 707/999.005 |
| 6,356,922 B1 | 3/2002 | Schilit et al. |
| 6,370,551 B1 | 4/2002 | Golovchinsky et al. |
| 6,601,061 B1 | 7/2003 | Holt et al. |
| 6,718,518 B1 | 4/2004 | Plow et al. |
| 6,732,090 B2 | 5/2004 | Shanahan et al. |
| 6,963,869 B2 | 11/2005 | Burrows |
| 6,983,282 B2 | 1/2006 | Stern et al. |
| 7,003,719 B1 | 2/2006 | Rosenoff et al. |
| 7,028,259 B1 | 4/2006 | Jacobson |
| 7,246,310 B1 | 7/2007 | Wolfe |
| 7,529,756 B1 * | 5/2009 | Haschart ........... G06F 17/30728 707/999.1 |
| 7,882,115 B2 | 2/2011 | Hirsch |
| 2002/0042784 A1 * | 4/2002 | Kerven ............. G06F 17/30672 706/12 |
| 2002/0089533 A1 * | 7/2002 | Hollaar ............. G06F 17/30014 715/738 |
| 2003/0046277 A1 | 3/2003 | Jackson et al. |
| 2005/0234893 A1 | 10/2005 | Hirsch |
| 2006/0190812 A1 | 8/2006 | Ellenby et al. |

OTHER PUBLICATIONS

Jan. 31, 2011 Office Action (U.S. Appl. No. 11/153,594).
Feb. 29, 2012 Office Action (U.S. Appl. No. 11/153,594).
Mar. 18, 2008 Office Action (U.S. Appl. No. 11/153,594).
Jul. 16, 2010 Office Action (U.S. Appl. No. 11/153,594).
Aug. 8, 2007 Office Action—(U.S. Appl. No. 11/153,594).
Sep. 27, 2011 Office Action (U.S. Appl. No. 11/153,594).
Oct. 19, 2010 Office Action (U.S. Appl. No. 11/153,594).
Oct. 26, 2009 Office Action (U.S. Appl. No. 11/153,594).
Dec. 31, 2012 USPTO Office Action (U.S. Appl. No. 11/153,594).
May 21, 2015 USPTO Office Action (U.S. Appl. No. 14/317,684).
Aug. 1, 2013 USPTO Office Action (U.S. Appl. No. 12/383,674).
Geronimo Development Corporation; Casefinder User's Manual, 2000-2001.
Nelson, Theodor Holm, "Xanalogical Structure, Needed Now More than Ever: Parallel Documents. Deep Links to Content, Deep Versioning, and Deep Re-Use", 1999, ACM, vol. 31, pp. 1-32.

* cited by examiner

SYSTEM AND METHOD FOR INDEXING AND DISPLAYING DOCUMENT TEXT THAT HAS BEEN SUBSEQUENTLY QUOTED

RELATED APPLICATION

This application is a continuation of U.S. patent application Ser. No. 14/317,684, filed Jun. 27, 2014 (the "'684 application," now U.S. Pat. No. 9,348,919). The '684 application is a continuation of U.S. patent application Ser. No. 12/383,674, filed Mar. 26, 2009 (the "'674 application," now U.S. Pat. No. 8,768,911). The '674 application claimed the benefit of U.S. Provisional Application No. 61/070,901, filed Mar. 26, 2008, and was also a continuation-in-part of U.S. patent application Ser. No. 11/153,594, filed on Jun. 15, 2005. All of these related applications are hereby incorporated by reference in their entireties.

FIELD OF THE INVENTION

The present invention relates to a database and browser combination that identifies text in a document that has been quoted by a later document, and both distinguishes the quoted text and provides a link to those documents that have quoted the quoted text.

BACKGROUND OF THE INVENTION

One method of "valuing" documents found in a search is to evaluate the citations made to these documents. For instance, American jurisprudence relies upon precedent. Judges must base their decisions upon principles set out in earlier cases, and must provide precise citations to the earlier decisions upon which they are relying. Consequently, prior art legal search engines have analyzed these citations in order to value documents and to rank search results. The CaseFinder service provided by the assignee of the present invention displays citations to other cases as hyperlinks, where one click takes the user to the text of the cited case. CaseFinder also uses this hyperlinking capability to provide a better search result ranking mechanism. The extent to which a document has been cited by later documents enhances the "value" of that document in search results.

CaseFinder shows the user a list of later cases that cite the found document. CaseFinder can arrange the documents in the list by using two kinds of relevance ranking that rely upon citations. In the first type, CaseFinder ranks documents according to the number of times they had been cited by other documents. The second type of ranking is similar, but in this instance, CaseFinder first assigns a "weight" to a citing document by determining how many times it had been cited. CaseFinder then uses the calculated weight of the citing documents, rather than a simple count of the citing documents, to rank the cited document.

SUMMARY OF THE INVENTION

By locating those items of text within a document that have been quoted by other documents, an important indicator of the value of the document can be determined using a minimal amount of human effort. This is accomplished by examining text documents for quotations of material from other documents and attribution of the quotation to that other document. When an attributed quotation is identified, the document from which it was quoted is located, and the presence of the quoted material within that document is confirmed. The presence within the quoted document of text that has been quoted, identification of the words that were quoted, and identification of the document doing the quoting, is then stored in association with the quoted document, along with the number of times the item of text was quoted in the quoting document. This allows subsequent display of items of quoted text and identification of all sources that have quoted such text from a document.

When displaying a document, the present invention can display a list setting forth the individual items of text within the document that were quoted by one or more other documents. The list may be inserted into the text of the document, most likely at the beginning, or it may appear in a separate window. This list may also display the number of documents quoting each such item of text and the total number of times each such item of text was quoted by all other documents. This list can be sorted to present the most frequently quoted items of text at the top of the list. This sorting can be based on the number of documents quoting each item of text or the total number of times each such item of text was quoted by later documents.

In addition, the text of documents can be displayed such that all items of text that have been quoted by another document are highlighted. This highlighting can take place by changing the color of the displayed font, creating a different colored background for that text, or otherwise visually emphasizing the importance of the text. Upon the selection of an item of quoted text by the user (either from the list or from the highlighted text within the document), the present invention displays a list of documents that have quoted that item of text. From this list the full text of a selected quoting document may be displayed.

The present system can be used to track and display quotations in a controlled environment of multiple documents, or in an uncontrolled, multi-user environment such as the World Wide Web. In a web environment, a crawler searches existing web pages for attributed quotations, and then stores information about those quotations in a database. This database is then made available to clients over the Internet via a server computer. When the user looks at a document in his browser, the URL for that document is submitted to the server and the database is queried to determine whether the document in the browser has been quoted by another document on the Web. If so, the user is given the ability to view an enhanced version of the original document, such enhanced version either being created by the server using the information found on the database, or having been stored on the server. This enhanced version will list, highlight, or otherwise delineate, those items of text in the document that have been quoted by other documents on the Web. Such delineated items of text will be associated with hyperlinks, which when selected by the user will bring up a page indicating where the selected text has been quoted by other documents.

DETAILED DESCRIPTION OF THE INVENTION

Overview of the System

Figure 1:
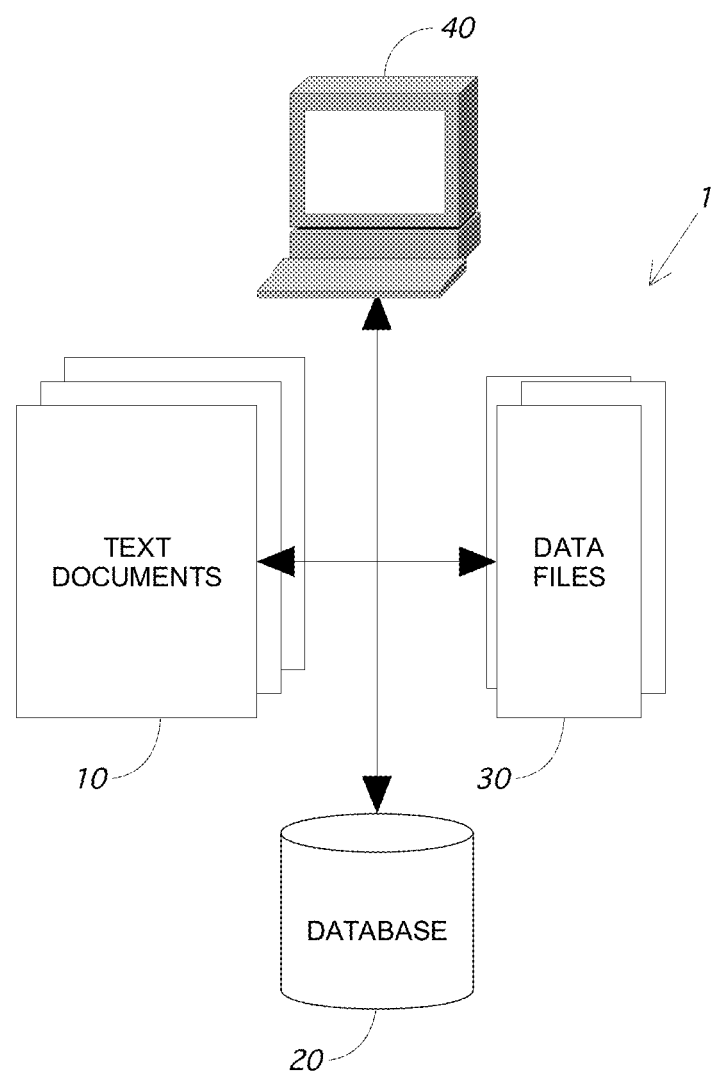
FIG. 1 is a schematic diagram showing the major elements of a first embodiment of the present invention.

FIG. 1 shows one embodiment of the present invention system 1. This embodiment 1 is designed to function with a set of text documents 10 in which some documents in the set quote text from other documents in the set. All documents 10 are contained in computer-readable files (sometimes referred to as text files), and information about each document and its text file is contained in a relational database 20. In addition, each of the document text files 10 has a data file 30 associated with it. The embodiment is comprised of modification programs operating on one or more general-purpose computers 40 that modify the text files 10, and modify information in the database 20 and the data files 30. The computer software further includes a document viewer program with added functionality that displays the text files 10. The document viewer software can operate on the same general-purpose computer 40 as the modification software. However, in the preferred embodiment, the viewer software forms part of the end-user software distributed to users of the system 1, while the modification software is operated as part of a centralized, data management system that creates and establishes the text documents 10, the database 20, and the data files 30. When distributed to the end user, the viewer software has access to the text documents 10 and the data files 30, but not to the database 20.

The text document files 10 preferably employ a format similar to HTML, in which "tags" delineated by "pointy brackets" ("<" and ">") contain information in the form of text. Neither the tag delimiters, nor the information within them, are shown when the document is displayed to an end user. The information within the tag is used by the document viewer for a variety of purposes, such as formatting instructions for all or part of the text of the document. The information may concern the document itself, such as its name, citation, author, date, etc. Tags may contain hyperlinks, which identify another file to be opened and displayed. Specifically relating to the embodiment shown in FIG. 1, tags in source text documents 10 will mark the beginning and end of text that has been quoted in other documents 10, and provide a unique identifier for the quoted material. This identifier need only be unique to a particular document, although it would be within the scope of the present invention to make the identifier globally unique. Tags in quoting text documents 10 will mark the beginning and end of the quotation, identify the source of the quoted material and disclose the unique identifier assigned to the quoted material in the source document.

Alternative ways for identifying items of quoted text in a source document would be clear to those of ordinary skill and are within the scope of the present invention. For instance, rather than placing tags directly around the item of quoted text, it would be possible to identify the location of the quoted text by calculating the offset position of the quoted text from a known position in the source document. For example, text within a document may be identified by a character count starting at the beginning of the document. Thus, rather than directly tagging the item of quoted text, a data construct can be used that indicates that the item of quoted text starts at a first character position and ends at a second character position. This data construct can be a meta-data tag within the source text document 10. Alternatively, the data construct could be external to the text document, such as in a data file 30 or an external database 20. Regardless of its location, the data construct can contain not only the location of the item of quoted text, but also the unique identifier associated with the quoted material. Similar data constructs can be used to identify quotations and source documents in quoting text documents 10.

The present invention uses two ways to identify each document 10 in the system: the citation, and the filename/document number. The document's citation is the formal identity of the document. For a scholarly article, the citation might be the volume number, the journal name, and the page number for the beginning of the article. For a legal opinion, the citation would include the volume number, the reporter name (or its abbreviation), and the page number of the beginning of the opinion. The filename is the name of the physical file containing the text document 10. In the preferred embodiment, each text document 10 and each data file 30 is stored in a separate file maintained by a standard, computerized file system. The text documents 10 and the data files 30 use identical names with differing extensions. The preferred embodiment uses filenames that consist of a six-character mnemonic that identifies the jurisdiction that issued the document, followed by a unique six-digit number for each document in that jurisdiction. Other methods of file-naming could be used that would also have some "mnemonic" relationship between the text file and the data file. The preferred embodiment provides a capacity of one million documents in each jurisdiction. Of course, it would be a simple matter to use a nine-digit number for each document in a jurisdiction, allowing a billion documents per jurisdiction. It would also be possible to use more characters in the mnemonic, to enable the system to handle more jurisdictions or to make the mnemonic more "readable." The text document files 10 then add a ".gml" extension. For example, "va_scp000001.gml" could contain the formatted text of a published decision of the Virginia Supreme Court. The related data file 30 bears the same primary file name as the document file 10, but with a different extension. Thus, the data file 30 "va_scp000001.qtd" contains information regarding the text document found in file "va_scp000001.gml", and preferably is found within the same encompassing folder used by the file system. The ".qtd" data file 30 contains information about the documents 10 in the system that cite or quote the document in its related ".gml" file. More specifically, the data file discloses, inter alia, the total number of citations, data about each citation, the total number of quotations, and data about each quotation. Whenever the document viewer opens a text file, it need only use the same file number with a different extension to open the associated data file.

The data file 30 contains "records" for each of the other documents 10 in the system 1 (the "quoting document") that cite or quote the document 10 having the same basic filename as the data file 30 (the "source document"). The layout of the records in the preferred embodiment of the data file 30 is as follows:

va_cap055213|Clay v. Commonwealth|33 Va. App. 963|4|97,2;198,1|2|2,1;7,1

Each record relates to a single document that quotes or cites the source document 10. The record has a total of seven fields, delineated above by the vertical bars. The first field is this quoting document's filename, while the second and third fields contain the quoting document's title and its citation. The fourth field indicates the total number of citations made by this quoting document to the source document. The fifth field identifies "pinpoint" citations by this quoting document to the source document. A pinpoint citation is one that refers to a specific page or pages within a case, or to a sub-section of a statute as is described in more detail below. Field five can identify multiple pinpoint citations, as this quoting document may cite the source document numerous times. Each pinpoint citation in field five contains a page number, a comma (or other delimiter), and the number of times that page or subsection in the source document was cited by this quoting document. A semi colon (or other delimiter) separates multiple pinpoint citations in field five. Field four may indicate more total cites than the number of pinpoint cites that are listed in field five, since not all citations are pinpoint citations. Field six indicates the number of times this quoting document has quoted the source document. Field seven identifies the quotations made by this quoting document from the source document. As with field five, semi-colons separate multiple quotations identified in field seven. Each quotation contains the unique identifier number assigned to the item of quoted text in the source document, a comma, and the number of times that item of text was quoted by this quoting document.

In addition to the text documents 10 and data files 30, document-related data is also contained in the database 20. This database 20 is used during the data recordation or modification process to automate some of the steps in the process, such as returning the name and location of a file containing a particular document 10 when queried with the citation to that document. The database 20 associates every text document 10 in the system 1 with a unique document number, which in the preferred embodiment is the same as the primary file name of the text document 10 and the data file 30 (such as "va_scp000001").

Figure 2:
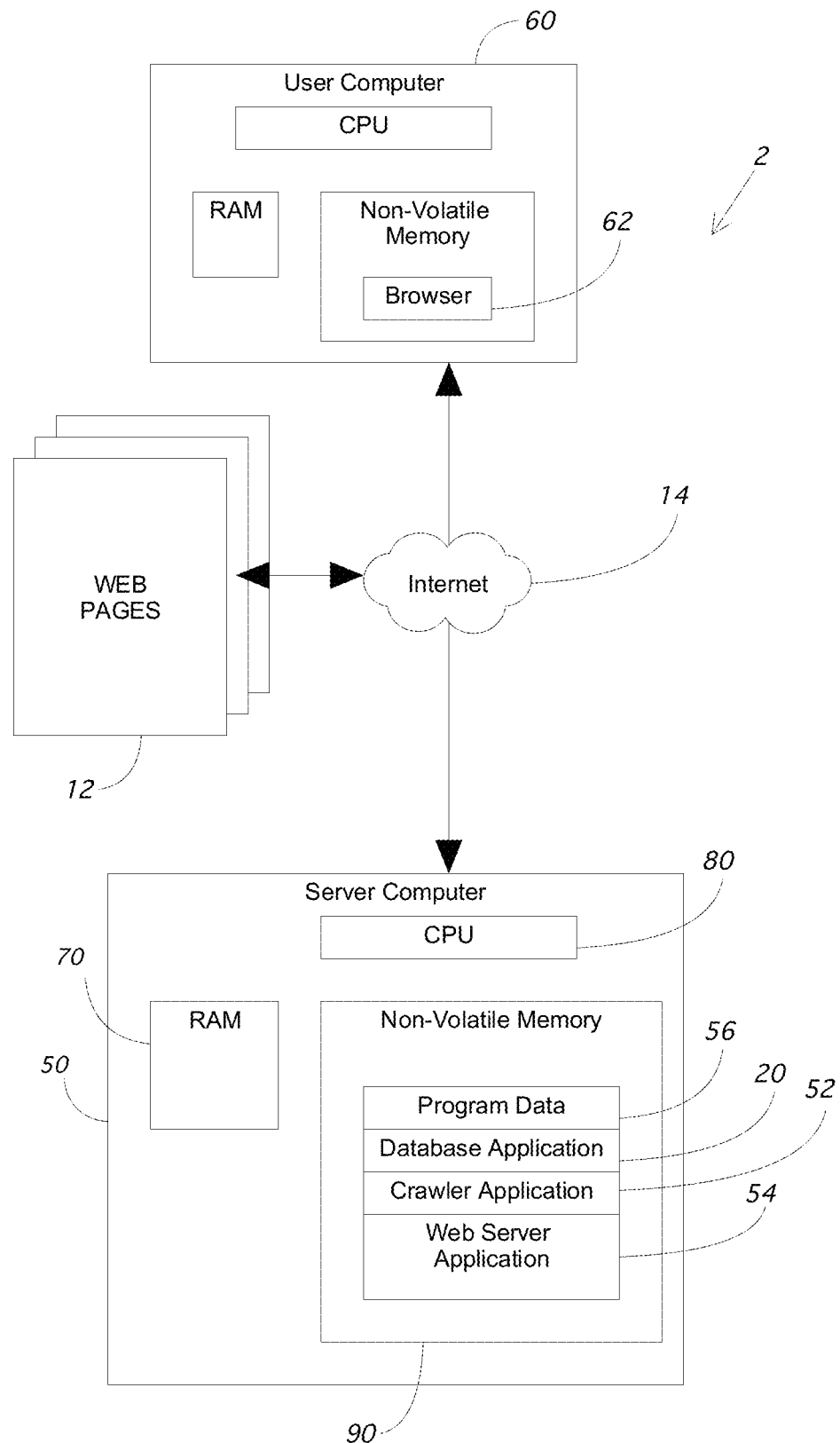
FIG. 2 is a schematic diagram showing the major elements of a second embodiment of the present invention.

FIG. 2 shows a second embodiment 2 of the present invention in which attributed quotations in web pages 12 are tracked. In this embodiment 2, a server computer 50 uses web crawler software 52 to identify and store quotations found within a set of web pages 12. These web pages 12 are generally HTML files that have been created by others and made available for public review and analysis by placing the documents on public areas of the World Wide Web through the Internet 14 (or other wide area network). When the software 52 on server computer 50 identifies a quotation in a web page 12 that has been attributed to another web page 12, information about the quoting and quoted document is stored in the database application 20, much as was the case in connection with the first embodiment 1. As explained above, all of the information stored in the data files 30 of the first embodiment 1 may be stored equally effectively in database 20. Consequently, the preferred version of the second embodiment eliminates the data files 30 and stores all information related to quotations, the source (or quoted) documents, and the quoting documents directly in the database 20.

A user computer 60 connected to the Internet 14 makes use of the information stored in database 20 through the use of browser software 62. In the preferred embodiment, the browser software 62 operating on computer 60 incorporates functionality, whether internally or by software extensions, that is able to communicate with the server 50 as the user computer 60 is browsing the web pages 12 over the Internet 14. This communication generally takes the form of informing the server 50 as to the URL of the web page that is being viewed. When the server 50 receives this information, the database 20 is queried to determine whether the web page 12 at that URL has been quoted by one or more other web pages 12. If so, server 50 sends an indication to computer 60 that text within the document being viewed in the browser has been quoted by other web pages. The browser will then present the user with the option to view a modified version of the current web page in which quoted text will be highlighted or otherwise distinguished. If the user elects to view this modified page, the server 50 is asked to construct the appropriate page based upon the contents of the original web page 12 as well as quotation information stored in database 20. Alternatively, the modified version of the web page may reside on server 50, and such modified version will be sent. This interaction with the browser software 62 on user computer 60 is handled by a specialized web server application 54 operating on the server computer 50.

When this modified page is viewed, the user will be able to identify the quoted text because it will be highlighted by the browser 62. The user will be presented an option to view the document(s) that quote the highlighted text. If the user so elects, the server 50 will create a list of quoting documents from the database 20 for review at the user computer 60. From the list, the user will be able to link to the web page 12 that quoted the original web page document. According to user preferences, the user can view the quoting web page in the original HTML format or in a custom HTML format created by the server 50. The custom format allows the server to indicate in the quoting web document where the particular quotation is found. In one embodiment, the custom formatted quoting document will be opened directly to the location in the document where the quotation is found. In addition, a link can be placed in the quoting document back to the original source document (which can also open directly to the location of the quotation) or to the list of documents that quote the selected passage of text.

As shown in FIG. 2, server computer 50 is a standard electronic digital computer that contains random access memory (or RAM) 70, a central processing unit (or CPU) 80, and some form of non-volatile memory 90. In the preferred embodiment, this computer 50 runs a general purpose operating system such as Microsoft Windows, Apple OS X, or Linux. The major functionality of the computer is controlled by application programs 20, 52, and 54 operating on CPU 80. The application programs 20, 52, 54 are stored in the non-volatile memory 90, and loaded into RAM 70 when controlling the CPU 80. Data 56 associated with the programs is also stored on non-volatile memory and transferred into RAM when needed for faster access by the CPU 80. The server computer 50 is connected to the Internet through a standard network interface (not shown in FIG. 2), such as an Ethernet or WiFi connection. The user computer 60 is also similarly configured with non-volatile memory, RAM, CPU, and network interface.

Figure 3:
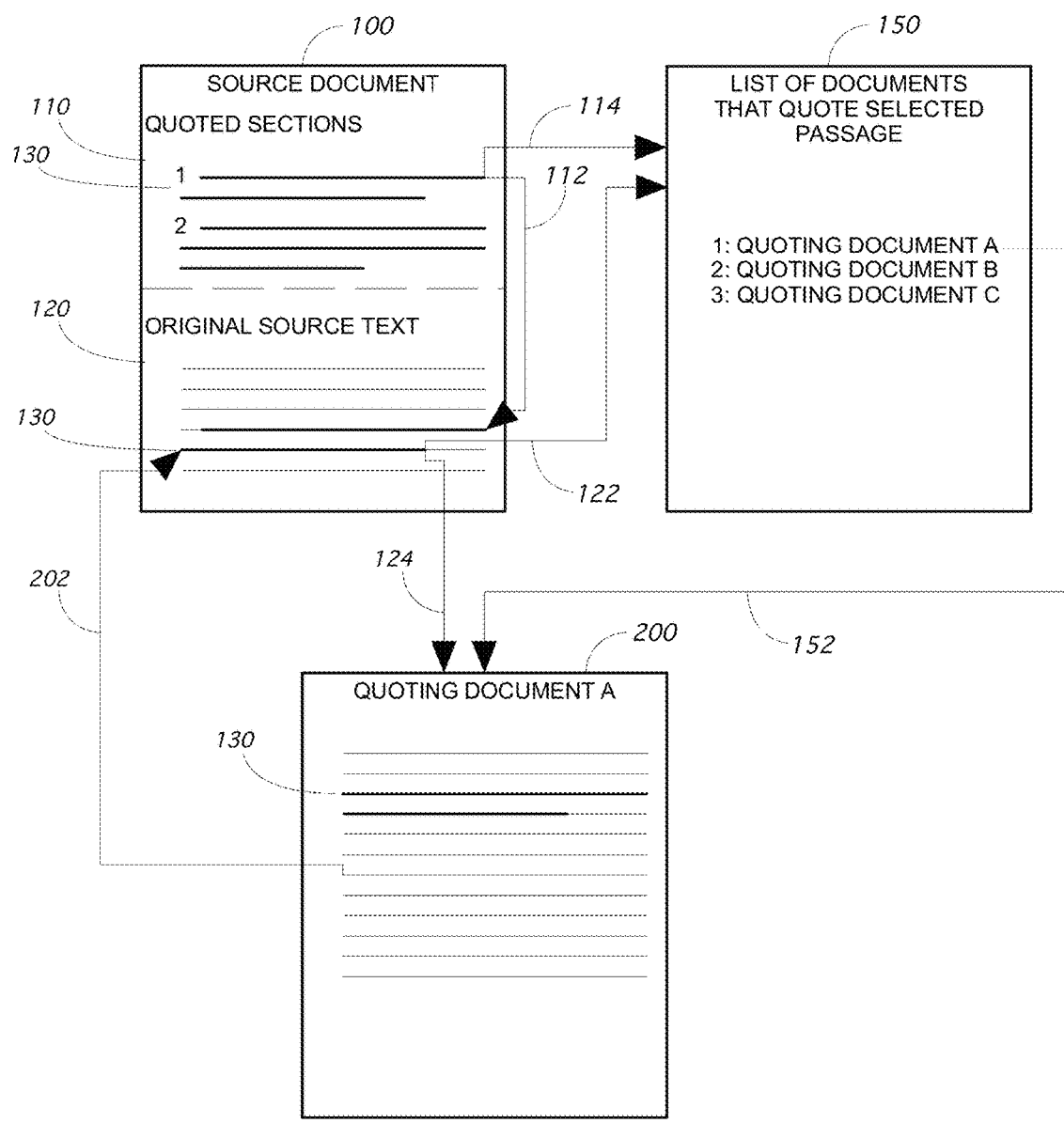
FIG. 3 is a schematic diagram showing the elements of an embodiment of the present invention as experienced by an end user.

FIG. 3 shows how an end user would experience the above embodiments when quoted text is highlighted. The end user starts by viewing a source document 100 containing text that is of interest to the user. For instance, an attorney may wish to view the text of a legal opinion, or an end user may wish to view the contents of a particular web page. The source document 100 may be presented in two parts: (1) a list of items of text 110 that other documents have quoted from the source document 100 and (2) the original source text 120. Items of text in the original source text 120 that have been quoted by another document in the system 1 may be highlighted in a color of the user's choosing or otherwise emphasized graphically. In the first embodiment the viewing software creates this view of the source document 100 using information found in the tags in the text document 10. In the second embodiment, the server 50 generates this view of the source web page 12 using information stored in its database 20.

In the embodiment shown in FIG. 3, the list 110 of items of quoted text precedes the source text 120, and the items of quoted text in the list 110 serve as a form of "headnotes." Headnotes are single paragraph analyses of the legal principles discussed in the case. Traditional headnotes are created manually by a trained attorney, and are therefore expensive and time-consuming to prepare. The present invention reveals those portions of a case which subsequent authors have deemed of such significance as to be worthy of quotation. Displaying such items of quoted text at the beginning of the document approximates the function of headnotes, but does so rapidly and at nominal cost, as the processing required needs minimal human input or oversight. In addition, the list 110 of items of quoted text is dynamic, changing each time a new document 10 or web page 12 is analyzed that quotes from source text 120. It can be seen that traditional legal case headnotes are "prospective"; they presume to say what is important about the case before the attorney population in general has had a chance to make that determination for themselves. In contrast, quotes are retrospective; after the case has been available for some time, judges writing subsequent opinions may have quoted items of text from the earlier decision that they deem especially valuable—the thrust of which may not be the same as what the headnote writers had expected.

The list 110 of items of quoted text can be hyperlinked (or otherwise linked) in one of two ways. For instance, a user could select one of the items of quoted text 130 and link directly to the place in the original source text 120 where the quoted text 130 is found. This hyperlink is shown in FIG. 2 by arrow 112. Alternatively, the user could link directly from the quote 130 to a list 150 that identifies all documents that have quoted the selected item of quoted text. This hyperlink is shown as arrow 114. It is also possible for the user to follow link 122 from the quoted text 130 as highlighted in the original source text 120 to the list of quoting documents 150.

These various links can be accessed in traditional ways well known in the prior art, such as by clicking on the text using a mouse or similar device. Where two possible destinations are shown in FIG. 3, such as with links 112 and 114, the end user could be presented with separate "buttons" or other interface devices to allow immediate selection of either link. Alternatively, the system 1 could present a contextual menu whenever the user selects an item of quoted text 130, with the contextual menu presenting the user with a list of possible hyperlink destinations. These are just a few of the known interface devices that could be used to select the hyperlinks of FIG. 2. These links can be formatted as standard hyperlinks that can be accessed by any standard web browser. Alternatively, the functionality of the hyperlinks could be implemented within the executable of the viewer software or browser extension used by the end user. In other words, the software that creates the user interface of FIG. 2 can create HTML that can be understood by any standard web browser, or the software can be a customized executable residing on a user computer that directly provides the user interface enhancements described above.

From the list 150, it is possible for the user to select an individual document and follow link 152 directly to the quoting document 200. In the first embodiment, the quoting document 200 is opened directly at the location where the item of quoted text 130 is found. In most cases, the quoting document 200 would contain a citation to the original source document 100. It is already known in the prior art to create a hyperlink (not shown) based on that citation directly back to the source document 100. In fact, in the second embodiment this link is used to identify and verify the quotation in the first place. However, the present invention has an additional hyperlink 202 related directly to the item of quoted text 130. By following this link, the end user can open the source document 100 directly at the location of the quoted text 130 in the original source text 120.

In one embodiment of the invention, a link 124 is also established from the quoted text 130 in the original source text 120 to the quoting document 200. When the user requests a contextual menu for a particular passage in the original source text 120, the menu will include a list of all cases having quotations that include the selected text. From the list, the selected quoting document 200 can be displayed, optionally scrolled to the place in the document 200 where the quote 130 appears. Ideally, the system 1 will highlight the quotation 130 in the quoting document 200 in an alternate color or in some other distinguishing format.

The fact that an item of text in a document has been quoted by other documents can be an indicator that the authors of the other documents placed a high value on the quoted document and/or the item of quoted text. This value indicator can be used in a variety of ways to improve the quality of results obtained by a user query of the text documents 10. First, since it is a simple matter to determine the number of times all quoting documents 150 quote a source document 100, this count can used to develop a score or value for the source document 100. This count is a good indicator of the importance placed upon that source document 100 by the authors of the other documents 200. This score can be used to rank text files 10 or web pages 12 relative to one another, which is especially useful when multiple text files 10 or web pages 12 are found in the same search result set after a user has executed a content search. In this embodiment of the present invention, the search software analyzes the count of quotations for each document 10 found in the search result set, and sorts the results based on this count. Alternatively, it is possible to compare a user's search query to the identified items of quoted text in every document returned by the user query. When a word in the query falls within an item of quoted text for a particular found document, this indicates that the author of another document quoted the found document for text relevant to the user's search query. In this case, additional value may be imparted to the found document, which may be used to sort the search results. A third option is to create a separate database by extracting and indexing the "tagged" quotations from all documents. This would enable the user to perform a search limited only to the text in the documents 10 that have been quoted by other documents 10.

Document Markup

Figure 4:
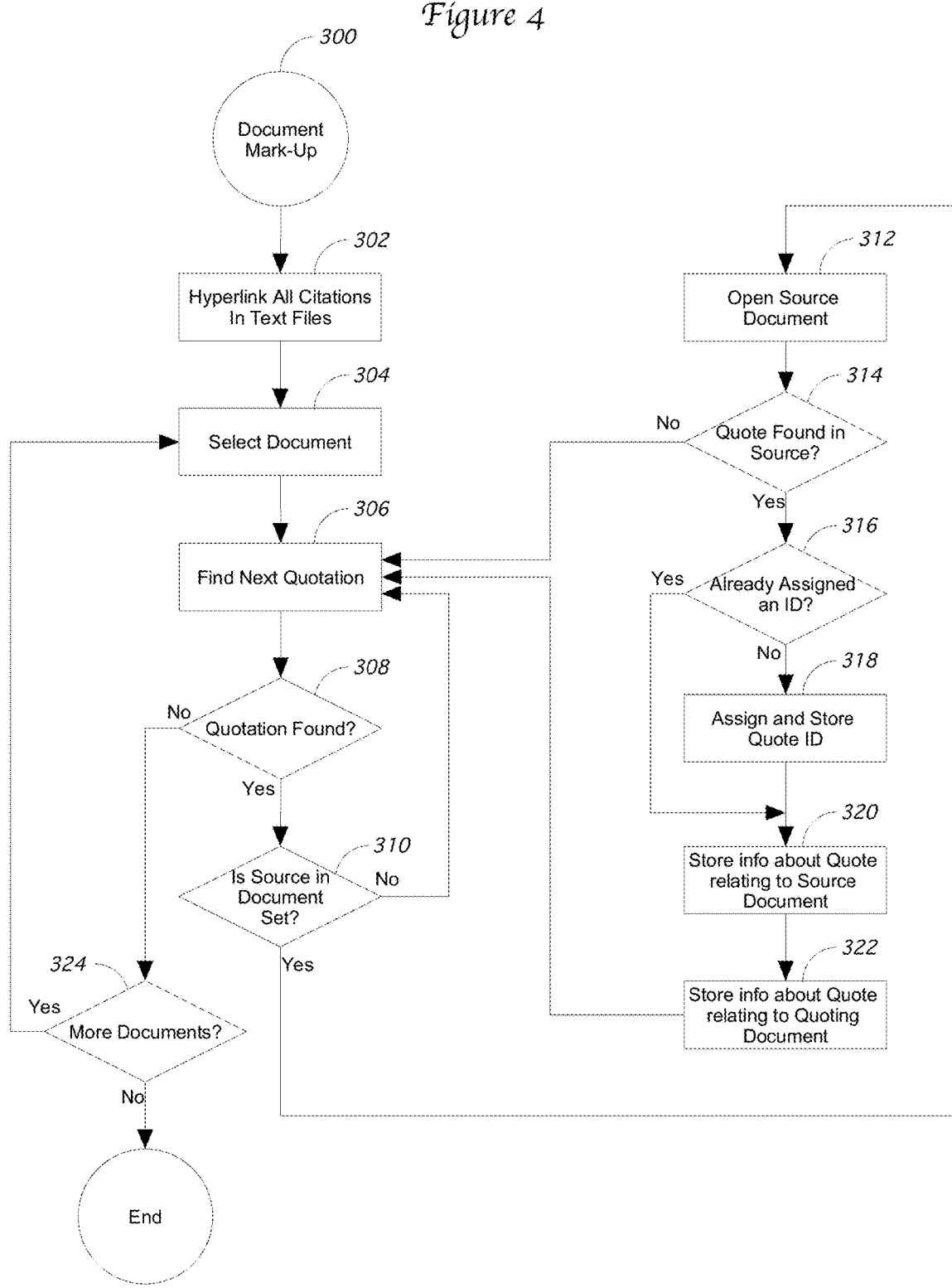
FIG. 4 is a flow chart showing the document mark-up process used by the present invention.

In the first embodiment, it is necessary to preprocess the text files 10, database 20, and data files 30 in order to create and/or present the list 110 of items of quoted text, hyperlinks 112, 114, 122, 124, 152, and 200 and the list of quoting documents 150. In the second embodiment, this same processing is done in order to update the database 20 so that the list 110 and hyperlinks 112, 114, 122, 124, 152, and 200, and the list of quoting documents can be created by the server 60 when requested by the browsing computer 50. The basic steps for accomplishing this function in the first embodiment are shown in the flow chart 300 of FIG. 4. Where changes are necessary to implement the second embodiment, those are discussed within the context of the discussion of FIG. 3.

In step 302, all the text files 10 in the system 1 are hyperlinked. This means that each citation to another document in the set is linked to the text file 10 representing the cited document. In the preferred embodiment, each quotation of text from another document should be accompanied by a citation to that document, and that citation will be hyperlinked in this step 302. The process for hyperlinking in step 302 is explained below in connection with FIG. 5, and includes the steps of creating or modifying a data file 30 for each document 10. The data file 30 will contain a record for each document that cites the document to which the data file belongs. This hyperlinking step 302 can batch process all documents 10 in the system 1, or can add the necessary hyperlinks whenever a new document 10 is added to the system 1. In the second embodiment 2 where the web pages 12 are created by third parties, these hyperlinks will be an inherent part of the web pages 12 and do not need to be added in this step 302.

In step 304, a text file 10 or web page 12 containing a document is selected and opened by one of the computer programs used by the document mark-up embodiment of the invention. The document is examined for quotations in step 306 by searching for material contained within double or single quotation marks. In the preferred embodiment, this step is made easier by first converting all quotation marks in the document 10, including both single and double quotation marks, to "smart" quotation marks. In addition, text whose formatting designates it as a quotation, such as an indented paragraph, is also recognized as a quotation. This system can also be programmed to ignore all quotations containing less than a specified number of words, or to ignore other text material as instructed by the user.

If step 308 discovers a quotation, step 310 determines whether the source document containing the quoted material is found in the text documents 10 that form the document set being handled by the present invention. To accomplish step 310, the citation of the source document 100 is determined by examining the text surrounding the quotation for citation hyperlinks such as those created in step 302. While in some circumstances this process could be fully automated, the preferred embodiment presents to an administrator one or more possible citations for the quotation, and asks the administrator to select the correct citation. The possible citations presented to the administrator will include all citations found in the current and all previous paragraphs of the quoting document. This enables the administrator to ensure that the quotation is from another document 100 within the document set 10 or available on the web, rather than from an unavailable document. For each quotation, the administrator can instruct the system to process the quotation using a selected citation, ignore the quotation this one time, or ignore this and all subsequent instances of the quotation in the quoting document. The administrator is also allowed to manually create a new hyperlink to a source document 100. Though rare, this situation could arise when a citation is not discovered in step 302, such as when a legal case is cited only by its popular name (such as Miranda). In the second embodiment 2, whenever a URL links one web page 12 to an existing source web page, the source page will be considered part of the relevant document set.

Using the selected citation, process 300 then opens the text file 10 or web page 12 containing the source document 100 in step 312. The text of the source document 100 is then examined for the quoted material in step 314. Algorithms in the present invention permit the searching process to handle some discrepancies between the quotation in the quoting document and the quoted material in the source document, such as ellipses or editorial upper- and lower-casing. The present invention is able to determine if there is a match in step 314, automatically finding exact matches and matches including only minor variations between the quotation and the source document. If an exact or nearly-exact match cannot be made automatically, the administrator is asked to locate the quoted text. To assist the administrator, the system attempts to make a partial match to the quotation, such as by searching for the first two words of the quotation. Once this is found, additional words and characters in the quotation are examined until a point of mismatch is discovered. At this point, the preferred embodiment seeks input from an administrator to verify the match. The embodiment displays that portion of the source document that contains the partial match, with the matching text highlighted. The administrator then determines whether the highlighted material in the source document constitutes the material that was quoted by the author of the quoting document. The administrator can highlight additional material in the quoted document as necessary to identify the text that was (or was intended to be) quoted. The administrator is also given the option to search for the next partial match. In most instances, the citation to the source document is a pinpoint citation, allowing the system to focus on the cited pages for the matching text. However, authors are known for including incorrect pages in their citations, so the present invention is capable of searching the entire source document for the quoted text.

If step 314 finds the quoted material in the source document 100 in the first embodiment, the characters immediately preceding and following the quoted material in the source document 100 are examined to see if the quoted material has been previously assigned a unique identifier in step 316. In this embodiment, the unique identifier is an integer assigned to each item of quoted text in the source document 100 that has been quoted by one or more quoting documents 200. The embodiment brackets the item of quoted text in the source document with tags that identify it as quoted text and contain a unique identifier for that item of quoted text. In the preferred embodiment, a tag in the form "<qs Q>" marks the beginning, and a "</qs Q>" tag marks the end of the quoted material (where "Q" is the unique identifier assigned to the item of quoted text). There are many alternative methods, well-known in the art, which can be used to store the information regarding the identifier and the beginning and end of the quoted material, either within the document file or in a separate file or database. If another document quoting the same material had been identified previously, then the tags will already be present and a unique identifier will already have been assigned to the quoted material. In this case, there is no need to assign a unique ID or add tags to identify the quotation, and step 316 continues processing at step 320. If the quotation has not been previously tagged, step 318 assigns a unique identifier and tags the item of quoted text in the source document 100.

The tags of the present invention are able to effectively handle "nested" quotations. For example, document A could contain the following statement: "Birds sing. Dogs bark. Cats meow. Fish bubble. Cows moo." Document B may quote only a portion of this thought: "Dogs bark. Cats meow. Fish bubble." This portion would be assigned unique identifier number 1. Document C may only quote "Cats meow" (unique identifier number 2) and document D may quote only "Cats meow. Fish bubble." (unique identifier number 3). The text in document A would be tagged as follows:

Birds sing. <qs 1>Dogs bark. <qs 3><qs 2>Cats meow.</qs 2> Fish bubble.</qs 3></qs 1> Cows moo.

---

In the second embodiment 2, the system will not be able to alter the source web page 12. Consequently, the identification of a previously assigned quotation identifier will occur by examining the database 20. Each quotation in a web page 12 can be individually identified in the database 20 by associating the quoted text with the URL that uniquely identifies the source web page 12. To check for previously assigned quotation identifiers, the URL can be submitted to the database with the quoted text. If a match is found, the previously created quotation identifier can be reused. Alternatively, it is possible to identify a quotation from a web page 12 by noting the offset location of the beginning and end of the quotation from the beginning of the web page 12. A flaw in this technique is that many web pages 12 are changed frequently, meaning the offset position of a quoted portion of text can change over time. Consequently, the preferred technique is to associate the quotation identifier with the text of the quotation rather than its position within the web page.

In step 320, the first embodiment opens and alters the data file 30 associated with the source document 100. More specifically, the data file 30 will contain a record for every document that cites the source document 100, including the quoting document 200. These records were created as part of the hyperlinking step 302. Step 320 involves locating the record in data file 30 for the quoting document and adding information about the quote to that record. In the preferred embodiment described above, the seventh field of the record contains the unique identifier of the quoted material and how many times such material was quoted by the quoting case. In the second embodiment 2, information indicating that the quoting document quotes a particular quoted text portion in the source document is stored directly in the database 20.

In step 322, the first embodiment inserts tags at the beginning and end of the quotation in the quoting document 200. These tags include the filename of the source document and the unique identifier assigned to the quoted material in the source document, and would be in the form of "<qt [filename]#Q>" to mark the beginning of the quote and "</qt [filename]#Q>" to mark the end. As an example, if the quotation were assigned unique identifier number 1 and were found in filename va_scp000001.gml (with the data file 30 found at va_scp000001.qtd), the quotation would be marked as follows:

<qt va_scp000001#1>(quotation)</qt va_scp000001#1>

It would also be possible to use other techniques to identify the location and source of the quotation in the quoting documents 200. For instance, the information could be stored elsewhere within the quoting document 200 or in a separate file (like a data file 30) or in database 20. In the second embodiment, this information is stored in database 20.

After the location and source of the quotation is stored in step 322, or after step 310 or 314 discover that the current quotation is not found in the documents 10 in system 1, steps 306 and 308 determine whether additional quotations are found in the current document. If so, step 310 begins processing the next quotation. If not, step 324 analyzes whether any additional documents are to be processed. If so, step 304 selects the next document to be analyzed. If not, the process 300 ends.

The above process 300 as used with the first embodiment can be better understood in the context of an example quotation. Assume that Smith v. Jones, 260 Va. 324 (file number va_scp034688) quotes the phrase "The law is a seamless web," citing page 71 of the earlier case of Watertown v. Braxton, 221 Va. 68 (file number va_scp032451). The Smith case is opened in step 304 and the system discovers the quotation in steps 306 and 308. The system highlights the quotation and presents it to an administrator, who instructs the system to process the quote. Alternatively, in the case of an exact match, the administrator verification could be skipped. The pin-point citation to 221 Va. at 71 is discovered, and optionally presented to the administrator with a list of all possible citations. More particularly, the present invention will display to the administrator a list of all citations in Smith that had been hyperlinked up to and including the paragraph containing the quote. The administrator selects Watertown from the list and instructs the system to continue at step 310. The system finds and opens the source document—va_scp032451.gml— at step 312, and automatically searches page 71 for the words "The law is a seamless web". Upon finding it at step 314, the system determines that the quoted material had not been previously tagged at step 316 and then determines that the next available unique identifier for materials quoted from Watertown is number 13 (step 318). The system then inserts a "<qs 13>" tag before, and a "</qs 13>" tag following, the phrase "The law is a seamless web" on page 71 of Watertown.

At step 320, the system also opens va_scp032451.qtd, the data file 30 associated with the Watertown file, and examines the first element of all records to find a match for va_scp034688, the file number of the Smith case. Finding the record created during the hyperlinking step 302, the quotelinker adds "13,1" in the seventh field of this record in the data file, and increments the total number of quotations (of Watertown by Smith) in field six.

va_scp034688|Smith v. Jones|260 Va. 324|1"71,1|1|13,1
This record indicates that the Watertown case is cited by and quoted by va_scp034588, also known as Smith v. Jones, 260 Va. 324. The citation is to page 71, and Watertown is cited once by Smith. The item of quoted text in Smith was assigned unique identifier number 13 in Watertown, and is quoted once by Smith. Returning to the file of the Smith case, the system at step 322 then inserts a "<qt va_scp032451#13>" tag before, and a "</qt va_scp032451#13>" tag after "The law is a seamless web" where it occurs in the text of Smith.

In yet another embodiment, the total number of times an item of text had been quoted by other documents could be placed within the opening <qs> tag within the text file 10. The viewing software could then determine the number of times the item has been quoted without consulting the data file 30. This means that the viewing software would not have to open the data file 30 in order to create the view of the source document 100 shown in FIG. 2. In this alternative embodiment, information as to the documents that have cited to or quoted material from the current text document 10 would remain in the data file 30, meaning that data file 30 would still be accessed in order to create document list 150. It would also be within the scope of the present invention to place this type of information directly within the tags found in the text documents 10, effectively merging the information in data files 30 into the text files 10. This information could be placed within the quotation tags, or more preferably could be placed with other meta data at the beginning or end of the text file 10.

Details of Hyperlinking Process

When a text file 10 containing a document is to be added to the system of the first embodiment, the present invention creates a record for that file in a master database 20. In the record for that file, the citation of the document is stored in the "citations" field, the filename is stored in the "filename" field, and if the document is a court opinion, the last page number in the opinion is obtained from the text file and stored in a "last page" field. There are also additional fields in the record. Information is available in database 20 for all documents 10 in system 1.

Figure 5:
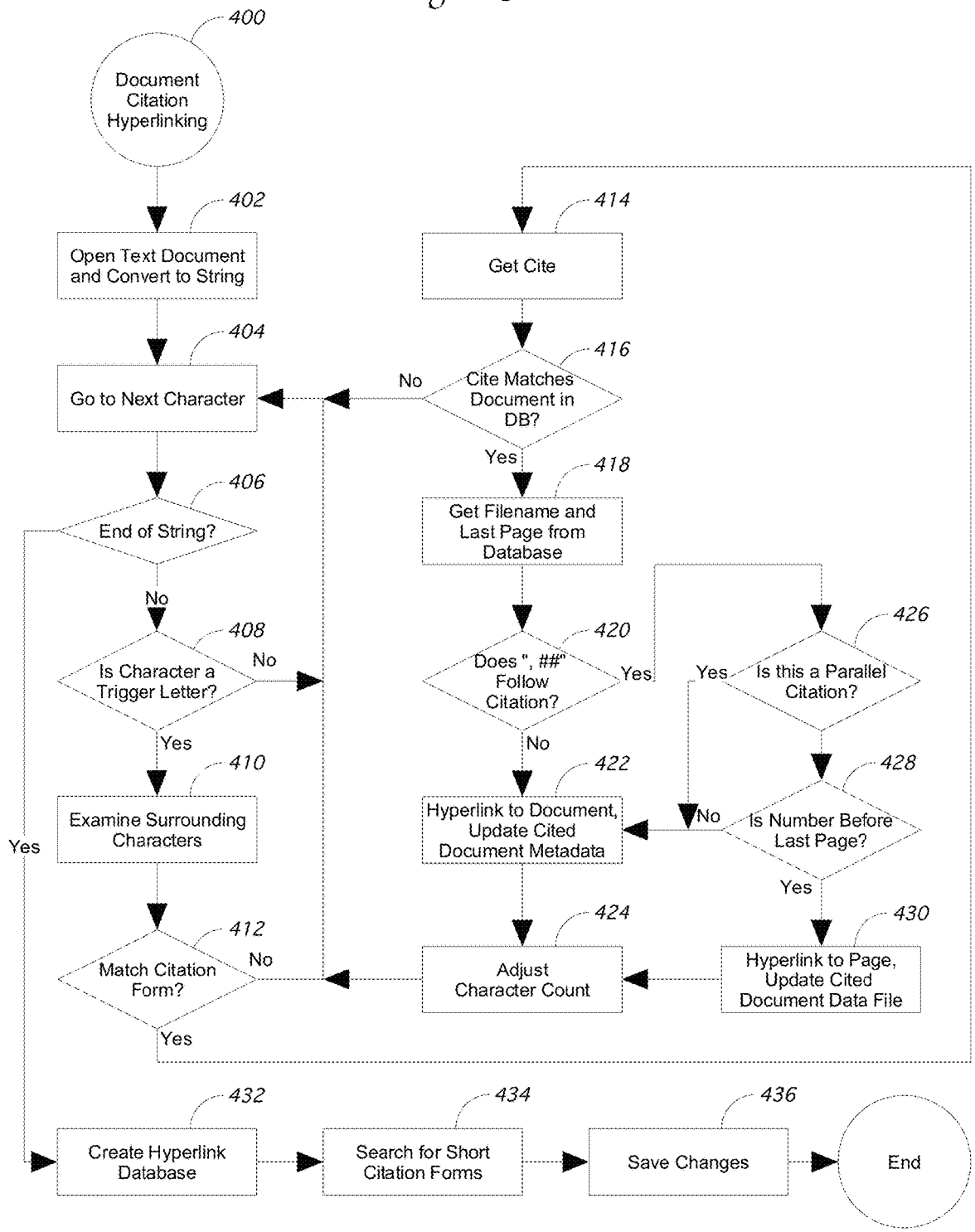
FIG. 5 is a flow chart showing the document citation hyperlinking process used by the present invention.

The database record is used by the first embodiment when it creates citation hyperlinks between two documents 10 in the system 1. The process 400 for doing so is shown in FIG. 5. This process begins by opening a document file 10 at step 402. A computer program of the present invention then parses the text, looking for patterns of letters and characters that suggest a full citation. In the preferred embodiment, this is accomplished by transforming the document into a single, long string (also in step 402) and then parsing the document character-by-character in step 404. There are other methods well-known in the art for parsing text.

If the end of the string is not detected at step 406, then the current character is analyzed at step 408 to determine if it could form part of a citation. In the legal context, citations to other legal opinions take well-known and predictable formats. For example, cases from the Virginia Supreme Court are cited in the form "222 Va. 194", where "222" is the number of the volume in the printed reporter series that contains the case, "Va." is the abbreviated name of the reporter series, and "194" is the page in the printed volume where the reported decision begins. Thus, to find citations to cases from the Virginia Supreme Court, the system 1 looks for the pattern "(Space)Va.(Space)". To find this citation format, the letter "V" is used as a trigger, since a citation must use this letter to specify the reporter name. The letter "V" could form a trigger for the Virginia Court of Appeals reporter, the West Virginia case reporters, as well as reporters from Vermont or the Virgin Islands. Of course, when examining documents from a variety of sources, many different letters will be considered trigger letters at step 408. For those characters that are not trigger letters, step 408 returns processing to step 404 and the next letter in the document 10 is analyzed.

If step 408 finds a trigger letter, step 410 will examine the characters surrounding the trigger letter to help determine whether the trigger letter actually forms part of a citation. For legal documents 10, the system 1 examines the letters surrounding the trigger letter to determine whether they form a legal reporter abbreviation, and then examines whether the "words" both preceding and following the pattern are composed of numbers. If not, then this is not a standard, "full" legal citation (which is determined at step 412), and processing continues with the next character at step 404.

If step 412 recognizes this as a potential citation, step 414 proceeds to understand the elements of the citation so that it can be used to query database 20 in step 416. This query determines whether the discovered citation relates to a text document 10 already in the system 1. If step 416 does not find such a match, then the citation does not reference a known document 10, and no hyperlink will be added for this citation. In this case, processing returns to step 404 to search for the next citation in the document.

While one would hope that every legal decision would have a unique citation, legal decisions sometimes have the same "full" citation. If one decision is extremely short, some publishers will begin another decision on the same printed page. Thus, after the database "look-up" is performed in step 416, a second look-up is done to determine if more than one document bears the same full citation. If so, the system alerts an administrator who is asked to determine which document is referenced by the citation.

If a match is found in step 416, that document's filename and last page field are retrieved from database 20 in step 418 and stored in memory. Next it is necessary to determine whether the discovered citation is a form of pinpoint citation. Particularly, whether the citation is in a form in which the pinpoint page number follows directly after the full citation to the case, e.g., "222 Va. 194, 198". In this, and other types of pin-point citations discussed herein, it often occurs that a page range is presented, such as "245-247" or "245-47" rather than a single page number. The present invention recognizes such cases by the hyphen, extracts the first and last pages of the range, determining the complete last page number when it has been foreshortened as in the second example above.

To determine whether the citation is a pin-point citation, step 420 determines if a comma and a number immediately follow the first discovered number following the reporter abbreviation in the citation. If not, the system knows that there is no pinpoint citation to a particular page in a document, and step 422 adds a hyperlink to the entire cited document. In the preferred embodiment, the hyperlink to a non-pin-point citation takes the following format:

<a ref="[FILENAME]">222 VA.194</A>

As explained above, every citation to a source document can be stored in the data file 30 associated with the source document, with a separate record for each citing document. Alternatively, this metadata may be stored in the text file 10 itself or within the database 20. Step 422 is responsible for updating the data file 30 by either creating a new record for the citing document or by adding the additional citation to an existing record. If the data file 30 were not automatically created earlier in the process, then step 422 would also be responsible for creating the data file 30. If a data file 30 is not being used in the embodiment, this metadata record is added to or updated in the text file 10 or the database 20.

Once the hyperlink is created in step 422, the process can return to step 404 to look for the next character. Optionally, step 424 can adjust the current character position in the string to account for all of the characters that have been incorporated into the current citation. That way characters that have already been analyzed do not need to be reanalyzed by steps 404-412.

If step 420 determines that the page number of the discovered citation is followed by a comma and another number, the second number may be the pinpoint page number of a pinpoint citation. The next step 426 is to verify that the second number is a page number from a pinpoint citation, rather than the volume number in a parallel citation. A legal decision may appear in more than one reporter series, in which case, the preferred practice is to provide a citation to each reporter. The first citation is always to the "official" reporter and the second (and subsequent) citation is deemed a "parallel" citation. A comma immediately following a number identifies the number as a page number. Compare a parallel citation without a pin-point cite: "222 Va. 194, 361 S.E.2d 238" to a parallel citation with a pinpoint cite: "222 Va. 194, 198, 361 S.E.2d 238, 241". Step 426 can determine whether the second number is a pinpoint page number by determining whether the potential pinpoint page number is followed by a comma, or by whether the word following the potential pinpoint page number is another reporter abbreviation. If the citation is not a pinpoint cite, and step 422 is called to hyperlink to the entire cited document.

If step 426 verifies that the second number is a pinpoint page number, step 428 examines whether the potential pin-point page number (or whether all of the page numbers within a range) falls between the first page number of the cited document and last page number of the cited document as determined in step 418. If not, then this is not a correct pinpoint citation, and step 422 is used to hyperlink to the entire document. If the pinpoint page number does fall within this range, step 430 creates a hyperlink to the pinpoint page or pages within the cited case. The format of this hyperlink is as follows:

<a ref="[FILENAME]#196>222 Va. 194, 196</a> where "196" is the pin-pointed page number. As was the case with step 422, step 430 also alters the data file 30 associated with the cited document 10 so as to add or alter a record that describes this pinpoint citation (or alternatively alters the metadata in text file 10 or database 20). At this point, the character count may be adjusted to skip all of the newly discovered pinpoint citation characters in step 424, and the next character is then analyzed in step 404.

When step 406 determines that the entire document 10 has been analyzed for full citations, it is necessary for process 400 to look for "short citation forms." This is because, even in the context of legal opinions, not all citations take the same general form. Short citation forms are generally acceptable when a citation is referring to a source that has previously been fully cited. For instance, pinpoint citations sometimes take the form in which the word "at" appears after the citation to the volume and reporter series, e.g., "222 Va. at 196." In addition, it is well known to refer to a previously cited source document by using an abbreviation for the Latin word Idem (meaning, "the same"), for example, "Id. at 45."

To look for these short citations form, step 432 creates a hyperlink database for the current document 10. To do so, step 432 parses through the text, counting each paragraph as encountered and finding the hyperlinks to cases. These hyperlinks are added as records in a temporary database (the "hyperlink database"). The record for each hyperlink has fields for the volume number, reporter name and first page number of the case (this data is derived from the full citation, which is retrieved from the master database), the last page number of the case (also retrieved from the master database), the pin-point page number (when applicable), the filename of the case (contained in the opening tag of the hyperlink), and the number of the paragraph in which the hyperlink was found.

Technically, the "hyperlink database" is a multi-dimensional array in memory. A multi-dimensional array is easily likened to a spreadsheet. Each "row" in the array contains several "columns" as follows:

| Volume | Reporter | First Page | Last Page | Pinpoint | Filename | ¶ |
|---|---|---|---|---|---|---|
| 222 | Va. | 194 | 199 | | va_scp044194 | 5 |
| 222 | Va. | | | 196 | va_scp044194 | 7 |

In the hyperlink array of the preferred embodiment, only full citations have entries in the first page and last page fields, and only pinpoint citations have entries in the pinpoint field.

Next, step 434 examines the document 10 by looking for short citation forms. This step is accomplished by first searching for the sequence "(space)at(space)". When found, the first word preceding the sequence is examined to see if it is the abbreviated name of a reporter (such as "Va."). If so, then the word preceding the abbreviated reporter name is examined to see if it is composed entirely of numbers (in our example, "222"). If so, then the number represents the number of the volume in a reporter series that contains the cited case. The volume number and reporter name are compared to the entries in the hyperlink database. If a match is found in the hyperlink database, then the word after the "(space)at(space)" sequence is examined. If it is composed of numerical digits, it represents a page number (or a range of pages). If that page number (or the numbers in the range) falls within the range of the first and last page numbers entered in the previously-located record(s) of the hyperlink database, the parser has found a valid pin-point cite, so it is tagged in the document as in step 430 above, and information regarding the pin-point citation is added to the hyperlink database. As was the case previously, step 430 also alters the data file 30 (or the database 20 or the metadata in text file 10) associated with the cited document 10 so as to add or alter a record that describes this citation.

If desired, step 434 can search the text file 10 for additional forms of short citations, such as "Id. at 45." When the pattern "Id. at (number)" is found, the hyperlink database is examined to see if there are one or more pre-existing hyperlinks in the paragraph in which the pattern is found. If so, then the page number following "Id. at" is compared to the first and last page numbers for each element for this paragraph in the hyperlink database. At the option of the user, process 400 could also look at data for preceding paragraphs in the hyperlink database if the desired citation is not found in the records for the current paragraph. If the page number falls within the range, the "Id. at" cite is tagged, and the metadata information is altered, as explained above.

Technically, if every document that could be cited in the form "Id. at" is contained in the system, and if the authors of the documents 10 never made mistakes in using the "Id. at" cites, step 434 could obtain much of the information by looking at the immediately preceding citation in the text of the document. This is because, by convention, "Id. at" indicates that the material is being cited to the same source as set out immediately above, albeit, at a different page. Since it is unrealistic to rely upon either condition, step 434 can be implemented so as to automatically tag only in those instances where the reporter and volume matches a previously tagged citation in the same paragraph and the pinpoint page number falls within the range of the cited document.

In the preferred embodiment, step 434 searches for a third short citation form, namely un-tagged instances of the word "Id." When an un-tagged instance of "Id." is found, the system displays a generous portion of the surrounding text, highlighting the "Id.", and presents this text to an administrator. If the administrator determines that the "Id." is a valid cite, the administrator instructs the system to display a list of previously cited documents assembled from the information in the hyperlink database. From that list, the administrator selects the citation matching that to which the "Id." is referring, and edits the hyperlink if necessary. The system then adds the hyperlink to the "Id." citation. As noted, step 434 could automatically create the hyperlink for "Id." citations merely by using the immediately previous citation in the hyperlink database. However, the automatic process will be effective only if all citations in the document 10 have been previously hyperlinked, and if the author correctly utilized the "Id." citation. Because of these conditions, the preferred embodiment presents "Id." citations to the administrator for confirmation and editing.

Overview of Document Viewing

Figure 6:
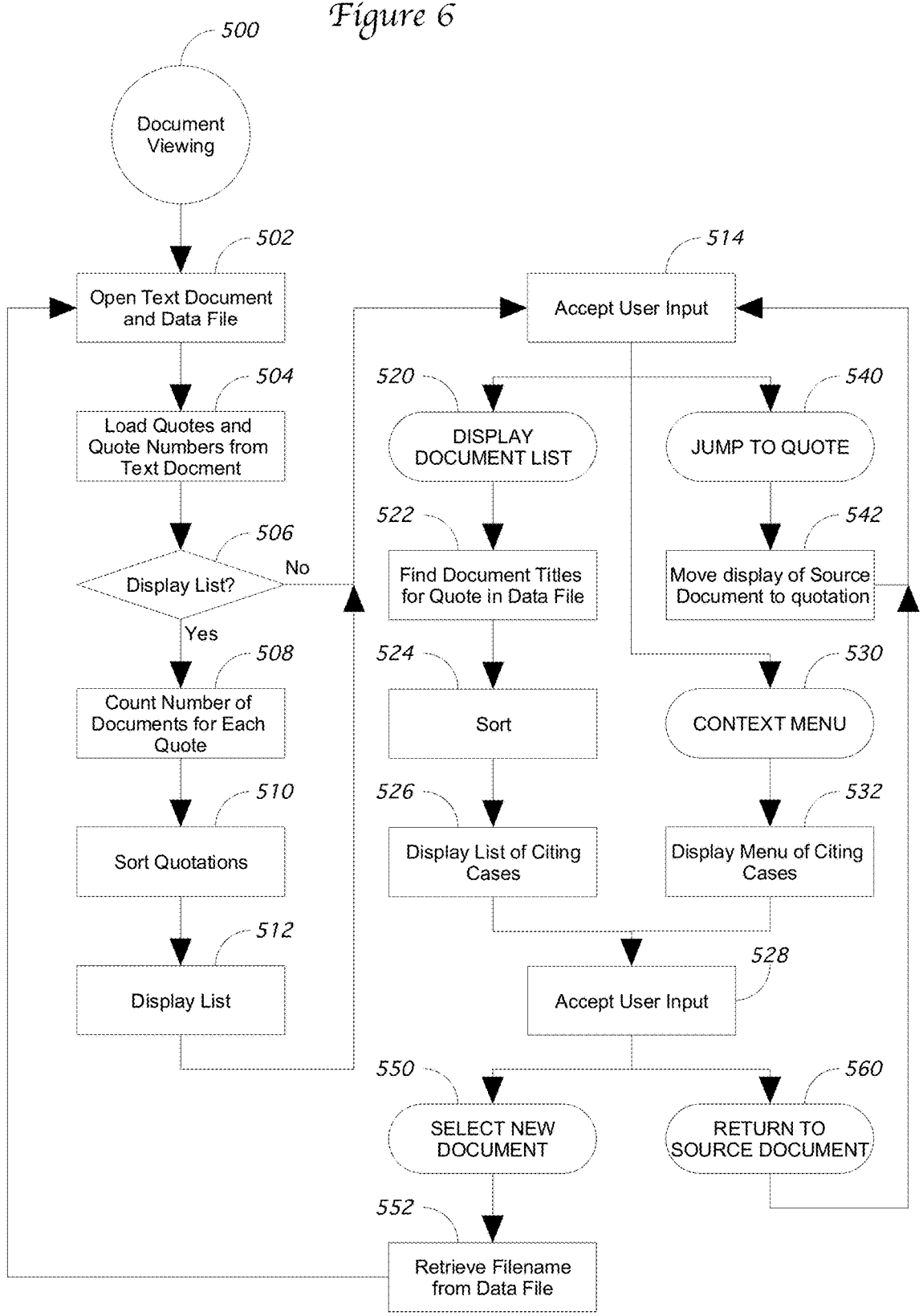
FIG. 6 is a flow chart showing the document viewing process used by the present invention.

FIG. 6 contains a flow chart 500 that summarizes the process by which the present invention displays a source document 100 for viewing in the first embodiment. The process 500 begins at step 502 by opening the text file 10 for the source and its related data file 30. The text document 10 for the source is scanned for tags identifying items of quoted text in step 504. Each item of quoted text is stored in memory, along with the identifier assigned to such quoted material. Step 506 is then used to determine whether list 110 of items of quoted text is to be displayed. In the preferred embodiment, this list is optional, and can be selected as a user preference. Assuming list 110 is to be displayed, the associated data file 30 is accessed and the total number of times each identified item was quoted by other documents is calculated and added to the record in memory for that item. Step 510 then sorts the list, such as by the total number of times each item was quoted. The list 110 is then displayed in step 512, which includes the text of each quotation.

In the second embodiment shown in FIG. 2, the source web page is initially viewed by the browser software on user computer 60 in its unaltered stated. When the user is informed that the document contains quoted text, the user can request that the browser or the browser extension load a specialized version of the source web page as received from the server 50. The server 50 is therefore responsible for creating the version of the source web page 100 as shown in FIG. 3. This is accomplished by using the original source web page 12 and the information stored about the quoted text in database 20.

At this point, the user is allowed to view and scroll through the source document 100. The system is able to accept user input during this viewing process, which is shown in the flowchart at step 514. This step 514 is also encountered if step 506 determines that the user has selected not to display the list of items of quoted text 110 at the beginning of the source document 100. In flow chart 500, there are only three options available to the user: to display document list 150 (choice 520), to display a contextual menu (choice 530), and to jump to specified quoted material 130 in the original source text 120 (choice 540). In actuality, the user may be presented with many options, such as the option to print the source document 100, to directly enter a citation to another document 10, or to quit the program. While these options are available to the user in the preferred embodiment, the options are not directly relevant to the present description and therefore are not shown in FIG. 6.

At step 514, the user may select to display a list of documents 150 that quote a selected item of quoted text from the currently displayed source document 100 (selection 520). As shown in FIG. 2, this list can be accessed either from the list of items of quoted text 110 or from the highlighted item of quoted text in the original source text 120. To create this list 150, the process retrieves from the associated data file 30 the titles of all documents 10 that quote the selected item of quoted text. The titles may be the formal case title if the documents are legal opinions, or article titles if the documents are scholarly or news articles. The display of documents in the list 150 is preferably sorted by the number of times each document quoted the item of quoted text in step 524. Once sorted, the list 150 is displayed in step 526. The elements in list 150 may include only the title of the quoting documents 200, or could include the entire citation of the documents 200. In the second embodiment, the server 50 creates the list 150 based on the information in database 20 about the documents that quote the selected item of quoted text.

Once the list 150 is created and presented to the end user, the computers 40, 60 will await user input at step 528. In FIG. 6, two possible input choices are presented: select new document 550 or return to source document 560. The select new document choice indicates that the user desires to view one of the quoting documents 200 that were presented in the list 150. If this choice is made, the system 1 in step 552 retrieves the file name of the selected quoting document 200, for example by accessing the data file 30 associated with the source document 100. At this point, the system 1 returns to step 502 with the quoting document 200 now being presented as the source document 100. In the second embodiment, the server 50 is requested to present the quoting document 200 as the new source document 100 at step 502. If choice 560 is made, the process 500 returns to viewing the original source document 100 and awaits user input at step 514.

At step 514, it is possible for the user to select a contextual menu at choice 530. This is typically accomplished by clicking the right mouse button when the cursor is positioned on a word in the document. If this choice 530 is made, a list of quoting documents 200 that quote items of quoted text that include the selected word is presented to the user directly in the contextual menu at step 532. The user can then select one of these documents for viewing, or return to viewing the original source document 100. Since these options are the same as step 528 in the context of displaying a document list 520, the flow chart in FIG. 5 shows the system 1 moving to step 528 after displaying the contextual menu of quoting documents in step 532.

The last choice presented at step 514 is to jump directly to an item of quoted text in the original source text 120, which is choice 540. This choice is represented by hyperlink 112 in FIG. 2. When this choice 540 is made, the display of the source document 100 is altered to show the quoted text in the original source text 120, preferably with the quoted text presented in a unique color or other highlight. After updating the view of the source document 100, the flow chart returns to step 514 to await additional user input.

Method of the Second Embodiment

Figure 7:
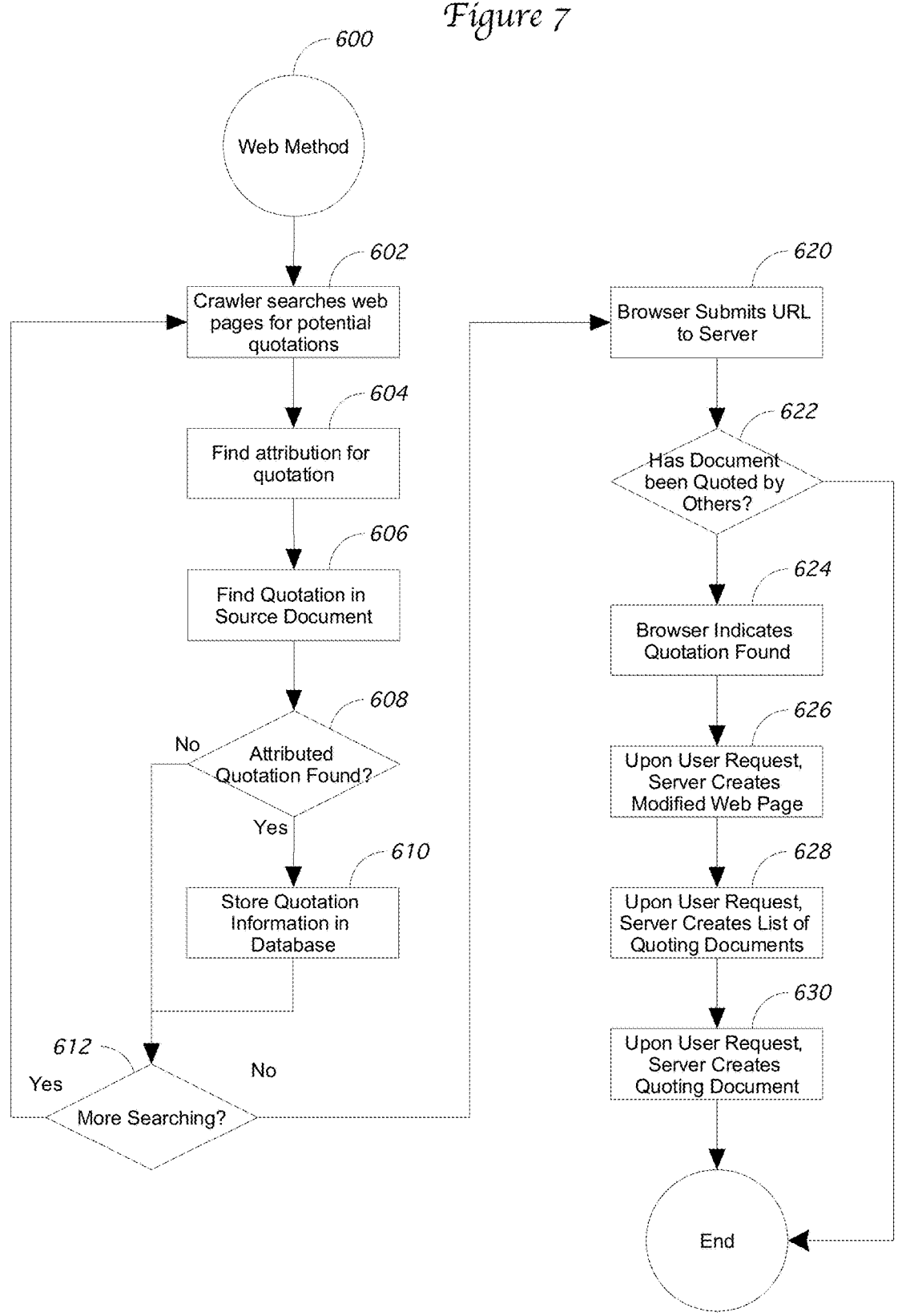
FIG. 7 is a flow chart showing the method used by the second embodiment of the invention.

FIG. 7 shows a flow chart setting forth the method 600 used for gathering and showing quotations by the second embodiment shown in FIG. 2. In this environment, a crawler will search existing web pages searching for potential quotations at step 602. These quotations are generally identified through quotations or indentations (such as by using the <blockquote> html tag). When the crawler identifies a potential quotation, it searches for an attribution immediately following or prior to the quotation in step 604. In the context of HTML documents on the World Wide Web, this attribution will generally take place in the form of an anchor (or <a>) tag. This tag provides the uniform resource locator (or URL) of the original document. The crawler can then examine this cited document for an occurrence of the quoted text in step 606. If the quoted text is found (as determined by step 608), the crawler notes the quotation, the quoting document, the location of the quotation in the quoting document, and the original source document. This information is stored at step 610 in a database accessible via a server computer connected to a wide area network such as the Internet. At this point, or if step 608 did not find proper attribution for the quotation, step 612 determines whether any additional quotations are to be searched for in the current document or other documents. If so, the method returns to step 602 for additional searching.

This database of quotations can then be accessed by a user using browser software with an appropriate extension, which is shown as the second portion of method 600. When the user looks at a document in their browser, the URL for that document is submitted to the database for query at step 620. This submission can be done manually (though a user interface tool such as a "go" or "find quotes" button) or automatically upon the loading of a new document. If the database indicates that the viewed document has been quoted by another document (as determined by step 622), the extension will indicate this fact to the user in step 624. If the user then desires, the extension will replace the current version of the view document with an enhanced version created by the server using the information found on the database (step 626). This version will contain indications of which sections of the document have been quoted by other documents. These indications include links, which when selected by the user brings up a page indicating where the selected text has been quoted by other documents (step 628). From this list, the user can choose to view a quoting document (step 630), which also can be specially formatted by the server to provide the functionality described above in connection with FIG. 3. At this point, method 600 is completed.

The present invention is not to be limited to all of the above details, as modifications and variations may be made without departing from the intent or scope of the invention. Consequently, the invention should not be limited by the specifics of the above description, but rather be limited only by the following claims and equivalent constructions.

What is claimed is:

1. A computerized method for weighting search results comprising:
   a) at a computer system, accessing a computerized database having data about quoting documents that attribute quoted documents as the source for quoted text portions, wherein the data identifies which quoting document quotes each quoted text portion in the quoted documents as well as a location for each quoted text portion within the quoted document;
   b) at the computer system, receiving a search query containing a search term from a user computer;
   c) at the computer system, identifying result documents that contain the search term;
   d) at the computer system, querying the computerized database to determine a count of the quoted text portions that are quoted from each result document, wherein the count is selected from a set consisting of i) a first count that includes only the quoted text portions containing the search term and ii) a second count that includes the quoted text portions that do not containing the search term;
   e) using the counts to create a sorted list of result documents; and
   f) returning the sorted list of result documents to the user computer.

2. The computerized method of claim 1, wherein the quoting documents and the quoted documents are web pages.

3. The computerized method of claim 1, wherein the data identifies the location for each quoted text portion within the quoted document through use of an offset location.

4. A computer system comprising:
   a) a central processing unit;
   b) random access memory;
   c) non-volatile memory;
   d) computer software in the non-volatile memory programmed to operate on the central processing unit, first software code programmed to:
      i) maintain a computerized database having data about quoting documents that attribute quoted documents as the source for quoted text portions, wherein the data identifies which quoting document quotes each quoted text portion in the quoted documents;
      ii) sort search results by
         (1) receiving a search query containing a search term from a user computer;
         (2) identifying result documents that contain the search term;
         (3) querying the computerized database to determine a count of the quoted text portions that are quoted from each result document, wherein the count is selected from a set consisting of i) a first count that includes only the quoted text portions containing the search term and ii) a second count that includes the quoted text portions that do not containing the search term;
         (4) creating a sorted list of result documents using the counts; and
         (5) returning the sorted list of result documents to the user computer.

5. The computer system of claim 4, wherein the quoting documents and the quoted documents are web pages.

6. The computer system of claim 5, wherein the database maintains a URL that uniquely identifies each web page.

7. The computer system of claim 6, wherein the data identifies a location for each quoted text portion within the quoted document through use of an offset location.

8. The computer system of claim 4, wherein the data identifies a location for each quoted text portion within the quoted document through use of an offset location.

* * * * *